US008755443B2

(12) United States Patent
Lakus-Becker

(10) Patent No.: US 8,755,443 B2
(45) Date of Patent: Jun. 17, 2014

(54) VIDEO SOURCE CODING WITH DECODER SIDE INFORMATION

(75) Inventor: Axel Lakus-Becker, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 1037 days.

(21) Appl. No.: 11/874,512

(22) Filed: Oct. 18, 2007

(65) Prior Publication Data

US 2009/0074077 A1 Mar. 19, 2009

(30) Foreign Application Priority Data

Oct. 19, 2006 (AU) ............................... 2006230691

(51) Int. Cl.
H04N 7/12 (2006.01)
H04N 7/36 (2006.01)
H04N 7/26 (2006.01)

(52) U.S. Cl.
CPC .... H04N 19/00715 (2013.01); H04N 19/00563 (2013.01)
USPC .................................................... 375/240.25

(58) Field of Classification Search
None
See application file for complete search history.

(56) References Cited

U.S. PATENT DOCUMENTS

| 6,343,098 | B1 * | 1/2002 | Boyce ...................... 375/240.03 |
| 7,271,747 | B2 * | 9/2007 | Baraniuk et al. ................ 341/87 |
| 7,295,137 | B2 * | 11/2007 | Liu et al. .......................... 341/51 |
| 7,653,867 | B2 * | 1/2010 | Stankovic et al. ............ 714/785 |
| 8,031,767 | B2 * | 10/2011 | Lee ........................... 375/240.01 |
| 8,036,263 | B2 * | 10/2011 | Wang et al. ............... 375/240.01 |
| 8,073,052 | B1 * | 12/2011 | Xu et al. .................... 375/240.03 |
| 2006/0153287 | A1 * | 7/2006 | Shen .............................. 375/240 |
| 2008/0031344 | A1 * | 2/2008 | Lu et al. .................... 375/240.19 |

FOREIGN PATENT DOCUMENTS

WO WO 2005/043882 5/2005

OTHER PUBLICATIONS

Kappos, David, "Subject Matter Eligibility of Computer Readable Media", Jan. 26, 2010.*
Qian Xu, et al., "Distributed Joint Source-channel Coding of Video Using Raptor Codes", Proc. of the IEEE 2005 Data Compression Conference (DCC '05), vol. 2, Sep. 11-14, 2005, pp. 674-677.
A. Aaron, et al., "Transform-domain Wyner-Ziv Codec for Video", Proc. of SPIE Visual Communications and Image Processing (VCIP 2004), vol. 5308, San Jose, CA, Jan. 2004.
Girod, B., et al., "Distributed Video Coding", Proc. of the IEEE, Special Issue on Advances in Video Coding and Delivery, Invited Paper, vol. 93, No. 1, Jan. 2005, pp. 71-83.

* cited by examiner

*Primary Examiner* — Faruk Hamza
*Assistant Examiner* — Cassandra Decker
(74) *Attorney, Agent, or Firm* — Fitzpatrick, Cella, Harper & Scinto

(57) ABSTRACT

A method and system (3000) of decoding video data using joint decoding (3100) of independently encoded sources (1010 and 3012) is disclosed. The method includes storing (1030) an initial estimate of first media data from a first source (1010). Second media data (3032) from a second source (3022) is received, with the second media data comprising parity bit data for correcting estimates derived from the first media data. The stored initial estimate is then retrieved, and the retrieved initial estimate and the received second media data are utilized to decode (3100) the media data.

14 Claims, 8 Drawing Sheets

VIDEO SOURCE CODING WITH DECODER SIDE INFORMATION

FIELD OF THE INVENTION

The present invention relates generally to video encoding and decoding and, in particular, to means of providing side information to a decoder.

BACKGROUND

Various products, such as digital cameras and digital video cameras, are used to capture images and video. These products contain an image sensing device, such as a charge coupled device (CCD), which is used to capture light energy focussed on the image sensing device that is indicative of a scene. The captured light energy is then processed to form a digital image. There are various formats to represent the digital images or videos, which include Motion JPEG, MPEG2, MPEG4 and H.264.

All the formats listed above have in common that they are compression formats. While those formats offer high quality and improve the number of images that can be stored on a given media, they typically suffer because of their long encoding runtime.

A complex encoder requires complex hardware. Complex encoding hardware in turn is disadvantageous in terms of design cost, manufacturing cost and physical size of the encoding hardware. Furthermore, long encoding runtime delays the camera shutter. Additionally, more complex encoding hardware has higher battery consumption. As battery life is essential for a mobile device, it is desirable that battery consumption be minimized in mobile devices.

To minimize battery consumption "distributed video coding" may be used. In distributed video coding the complexity of the encoder is shifted to the decoder. In distributed video coding the input video stream is split into key frames and non-key frames. The key frames are compressed using a conventional coding scheme as Motion JPEG, MPEG2, MPEG4 or H.264. The decoder is conventionally decoding the key-frames. With the help of the key-frames the non-key frames are predicted. This can be considered as carrying out motion estimation on the decoder side. The predicted non-key frames are improved in terms of visual quality with the information the encoder is providing for the non-key frames.

The visual quality of the decoded video stream depends heavily on the quality of the prediction of the non-key frames. A prior art approach is to improve the quality of the prediction of the non-key frames by the encoder obtaining more information by carrying out partial motion estimation, or other video analysis methods. This additional information is then additionally transmitted to support the prediction carried out by the decoder. Of course, employing video analysis methods on the encoder increases the complexity of the encoder. This is undesirable.

SUMMARY

It is an object of the present invention to substantially overcome, or at least ameliorate, one or more disadvantages of existing arrangements.

According to a first aspect of the present disclosure, there is provided a method of decoding media data using joint decoding of independently encoded sources, said methods comprising the steps of:

forming an initial estimate by applying compositing operations to at least a portion of first media data from a first source of said independently encoded sources;

storing said initial estimate;

receiving second media data from a second source of said independently encoded sources, said second media data comprising parity bit data for correcting estimates derived from said first media data;

retrieving the stored initial estimate; and utilizing the retrieved initial estimate and the received second media data to decode the media data.

According to another aspect of the present disclosure, there is provided an apparatus for implementing the aforementioned method.

According to another aspect of the present disclosure there is provided a computer program product including a computer readable medium having recorded thereon a computer program for implementing the method described above.

Other aspects of the invention are also disclosed.

BRIEF DESCRIPTION OF THE DRAWINGS

One or more embodiments of the present invention will now be described with reference to the drawings, in which.

DETAILED DESCRIPTION

Figure 1:
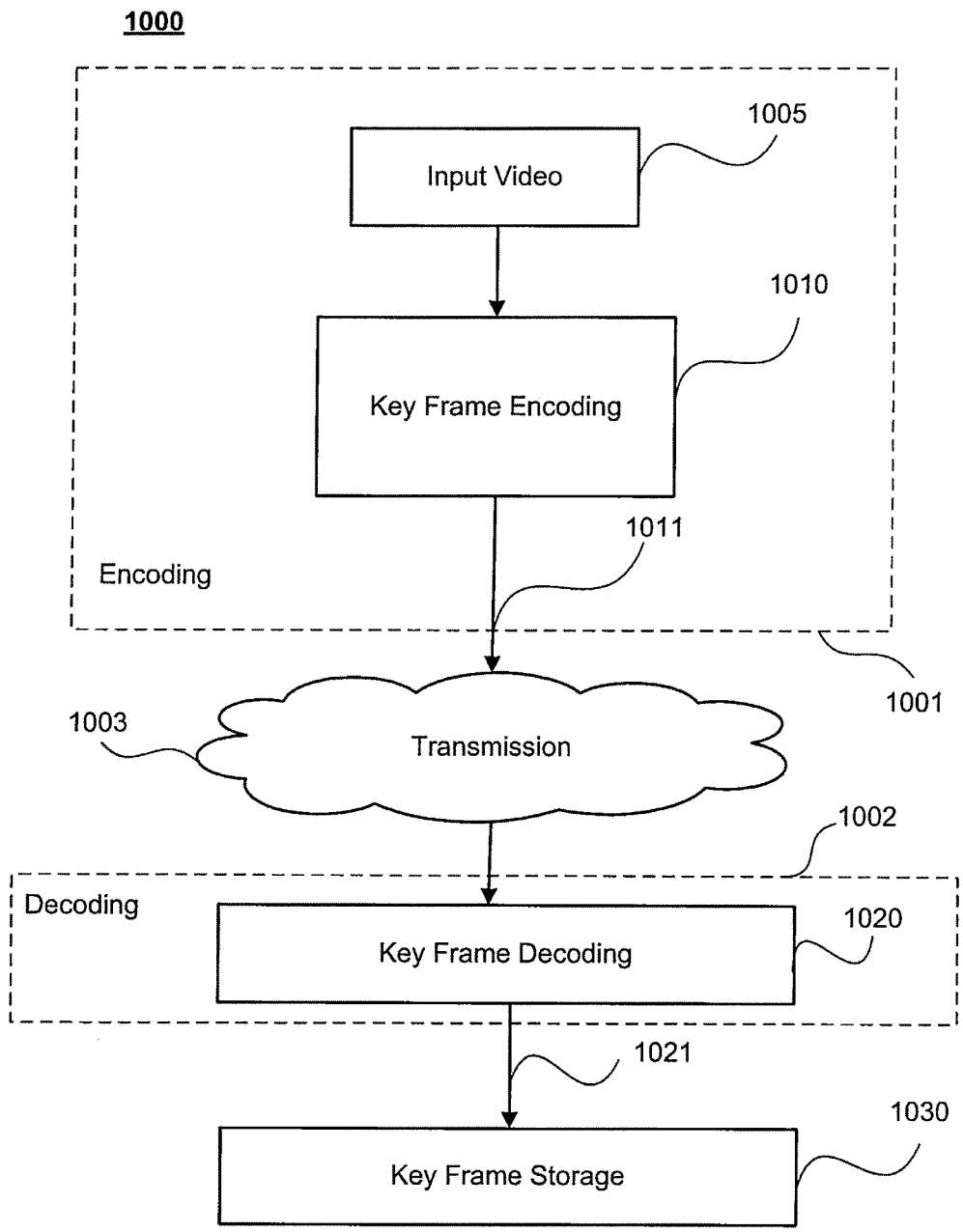
FIG. 1 shows a schematic block diagram of a system for storing key frames in a key frame storage device.

Where reference is made in any one or more of the accompanying drawings to steps and/or features, which have the same reference numerals, those steps and/or features have for the purposes of this description the same function(s) or operation(s), unless the contrary intention appears.

The description relates to decoding of video data. However, a person skilled in the art would understand that the disclosed methods may equally be applied to any media data, including audio data.

FIG. 1 shows a schematic block diagram of a system 1000 for storing key frames in a key frame storage device 1030. The system 1000 includes an encoder 1001 and a decoder 1002 interconnected through a transmission medium 1003, and the key frame storage device 1030.

Key frames are generated from an input video 1005 at the encoder 1001. In the preferred embodiment the camera used to capture the input video 1005 has a zoom capability, and the scene captured by the camera is scanned at least once for each possible zoom setting.

The input video 1005 is compressed with "key-frame" encoding in a key frame encoder 1010 to form encoded video data 1011. Preferably the camera viewing angle and the zoom setting are stored in video header tags of the encoded video data 1011. In the preferred embodiment Motion JPEG is used as the key-frame encoding, and is described in greater detail below. Alternatively, if the camera can capture raw data, raw data can be transmitted instead of encoded video data.

The encoded video data 1011 is transmitted over the transmission medium 1003 to the decoder 1002, which comprises a key frame decoder 1020, where key frames 1021 are produced. Finally, the key frames 1021 are stored in the key frame storage device 1030 for later use. One or more key frames may be selected or composited by applying compositing operations to at least a portion of the key frames to form an initial estimate of the input video 1005.

Figure 2:
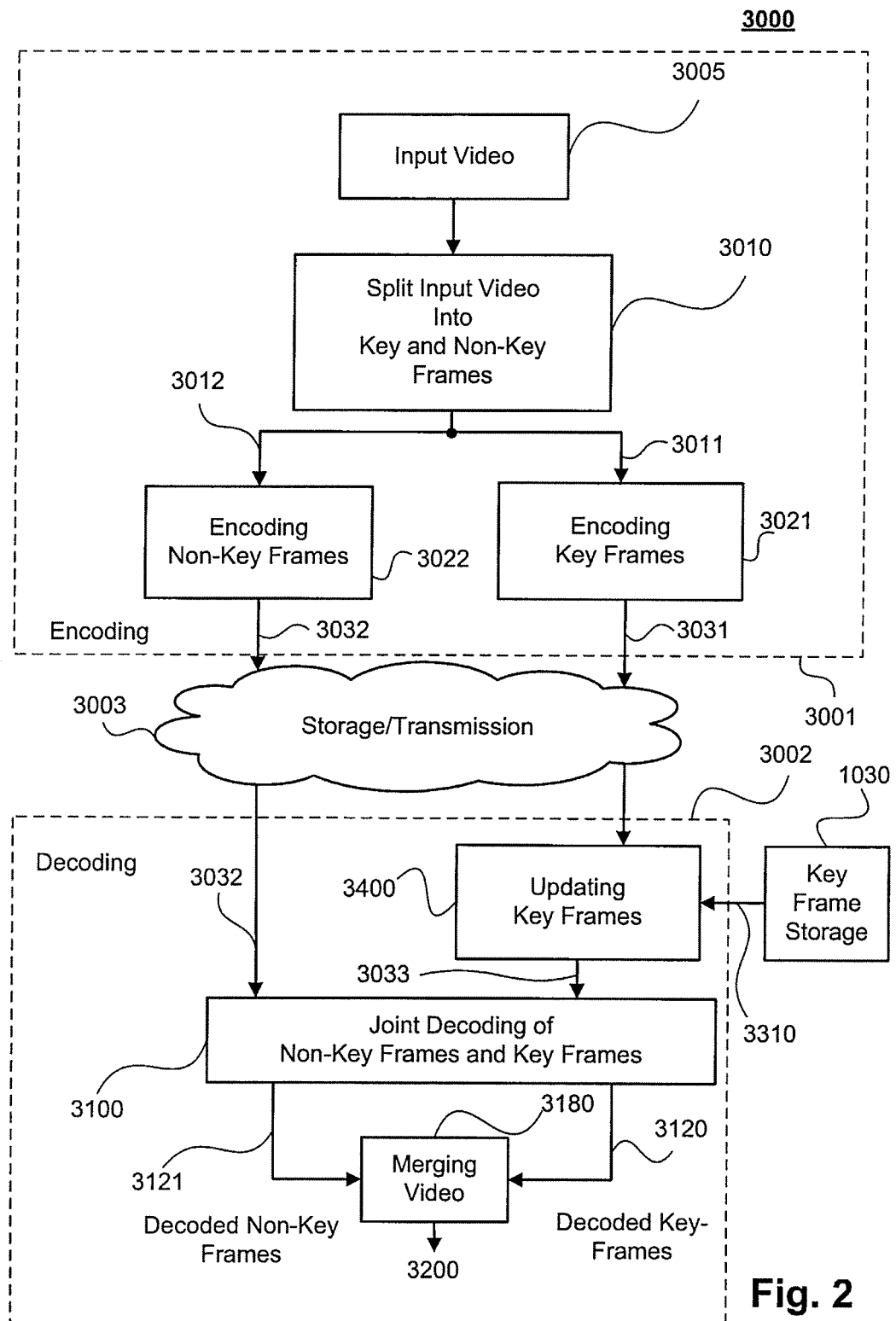
FIGS. 2 and 3 show schematic block diagrams of systems for encoding input video, for transmitting or storing the encoded video and for decoding the video.

FIG. 2 shows a schematic block diagram of a system 3000 for encoding an input video 3005, for transmitting or storing the encoded video and for decoding the video. The system 3000 includes an encoder 3001 and a decoder 3002 interconnected through a storage or transmission medium 3003. The system 3000 also includes key frame storage device 1030, with key frames stored therein in the manner described with reference to FIG. 1.

Figure 5:
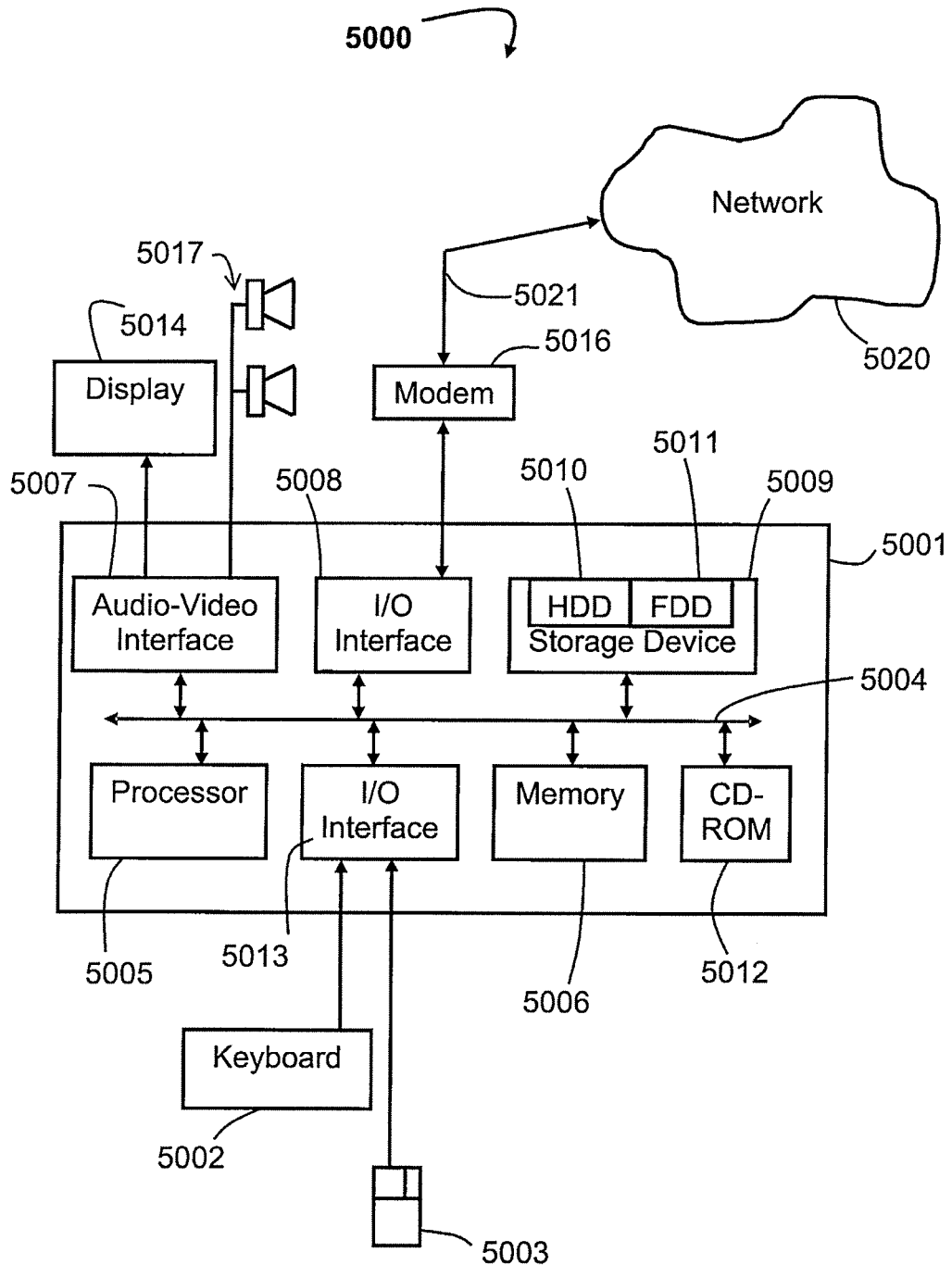
FIG. 5 shows a schematic block diagram of a computer system in which the systems shown in FIGS. 1, 2 and 3 may be implemented.

The components 3001, 3002 and 3003 of the system 3000 may be implemented using a computer system 5000, such as that shown in FIG. 5, wherein the encoder 3001 and decoder 3002 may be implemented as software, such as one or more application programs executable within the computer system 5000. The software may be stored in a computer readable storage medium, including the storage devices described below, for example. The software is loaded into the computer system 5000 from the computer readable storage medium, and then executed by the computer system 5000. A computer readable storage medium having such software or computer program recorded on it is a computer program product.

As seen in FIG. 5, the computer system 5000 is formed by a computer module 5001, input devices such as a keyboard 5002 and a mouse pointer device 5003, and output devices including a display device 5014 and loudspeakers 5017. An external Modulator-Demodulator (Modem) transceiver device 5016 may be used by the computer module 5001 for communicating to and from a communications network 5020 via a connection 5021.

The computer module 5001 typically includes at least one processor unit 5005, and a memory unit 5006. The module 5001 also includes an number of input/output (I/O) interfaces including an audio-video interface 5007 that couples to the video display 5014 and loudspeakers 5017, an I/O interface 5013 for the keyboard 5002 and mouse 5003, and an interface 5008 for the external modem 5016. In some implementations, the modem 5016 may be incorporated within the computer module 5001, for example within the interface 5008. A storage device 5009 is provided and typically includes a hard disk drive 5010 and a floppy disk drive 5011. A CD-ROM drive 5012 is typically provided as a non-volatile source of data.

The components 5005, to 5013 of the computer module 5001 typically communicate via an interconnected bus 5004 and in a manner which results in a conventional mode of operation of the computer system 5000 known to those in the relevant art.

Typically, the application programs discussed above are resident on the hard disk drive 5010 and read and controlled in execution by the processor 5005. Intermediate storage of such programs and any data fetched from the network 5020 may be accomplished using the semiconductor memory 5006, possibly in concert with the hard disk drive 5010. In some instances, the application programs may be supplied to the user encoded on one or more CD-ROM and read via the corresponding drive 5012, or alternatively may be read by the user from the network 5020. Still further, the software can also be loaded into the computer system 5000 from other computer readable storage media. Computer readable storage media refers to any non-transitory storage medium that participates in providing instructions and/or data to the computer system 5000 for execution and/or processing.

The system 3000 may alternatively be implemented in dedicated hardware such as one or more integrated circuits. Such dedicated hardware may include graphic processors, digital signal processors, or one or more microprocessors and associated memories.

In one implementation encoder 3001 and a decoder 3002 are implemented within a camera (not illustrated), wherein the encoder 3001 and the decoder 3002 may be implemented as software executing in a processor of the camera, or implemented using hardware.

In a second implementation only encoder 3001 is implemented within a camera, wherein the encoder 3001 may be implemented as software executing in a processor of the camera, or implemented using hardware.

Referring again to FIG. 2, as in conventional video compression techniques, which include the MPEG1, MPEG2 and MPEG4 compression standards, a input video 3005 is split by a frame splitter 3010 into key frames 3011 and non-key frames 3012. Typically, every $5^{th}$ frame is a key frame 3011. The key frames 3011 and the non-key frames 3012 are encoded in encoders 3021 and 3022 respectively, with encoders 3021 and 3022 operating differently. Also, unlike normal differential coding, the encoding of the key frames 3011 and the encoding of the non-key frames 3012 are independent.

Encoded key-frames 3031 and encoded non-key frames 3032 are stored or transmitted using the storage or transmission medium 3003. The decoder 3002 receives both the encoded key-frames 3031 and the encoded non-key frames 3032.

Upon receipt of the encoded key frames 3031 by the decoder 3002 the encoded key frames 3031 are decoded, updated and improved in a key frame updater 3400 using data retrieved from the key frame storage device 1030 to produce updated key frames 3033. The key frame updater 3400 is described in more detail below.

A joint decoder 3100 decodes the encoded non-key frames 3032 to produce decoded non-key frames 3121. More particularly, the encoded non-key frames 3032 are decoded utilizing information from the updated key-frames 3033 and the encoded non-key frames 3032. The updated key-frames 3120 and decoded non-key frames 3121 are merged together in a merger 3180 to form output video 3200.

The encoding of frames 3011 and 3012 is now described in greater detail. The encoding of the key frames 3011 is first described, followed by a description of encoding of the non-key frames 3012. Key frame encoding performed in the key frame encoder 1010 of FIG. 1 operates in the same manner as key frame encoder 3021.

In a first implementation the encoding of key frames 3011 performed in the key frame encoder 3021 preferably employs the JPEG compression standard. In baseline mode JPEG compression, and in reverse using inverse operation decompression, an image (or frame) is typically tiled into a plurality of blocks, each block comprising eight rows of eight pixels (hereinafter referred to as an 8×8 block of pixels, or simply a block of pixels). If necessary, extra columns of image pixel data are appended to the image by replicating a column of the image, so that the image width is a multiple of eight. Similarly, a row of the image is replicated to extend the image, if necessary. Each 8×8 block of pixels is then discrete cosine transformed (DCT) into an 8×8 block of DCT coefficients. The coefficients of each block of the image is quantised and arranged in a "zigzag" scan order. The coefficients are then lossless encoded using a zero run-length and magnitude type code with Huffman coding, or Arithmetic coding. In this manner, all the coefficients (i.e. the entire zigzag sequence) of one block of pixels are encoded, into a bit-stream, before a next block is encoded into the bit-stream. The blocks of the tiled image are processed in raster scan order as required by the baseline JPEG standard.

In the spectral selection mode of JPEG compression, the zigzag sequence of coefficients, for each 8×8 block of DCT coefficients, is divided into a plurality of contiguous segments. Each contiguous segment is then encoded, in order, in separate scans through the image. That is, coefficients in a first segment of each block are encoded into a bit-stream before coefficients of a next segment of each block are encoded, and so on until substantially all segments of preferably every block of the image are encoded.

While JPEG compression is predominantly used to compress a still image, there are various video encoding formats known loosely as "Motion JPEG". Motion JPEG encodes each frame of a video as a still image using JPEG, and provides a compressed video stream format for wrapping all the encoded frames of a video into a Motion JPEG encoded stream. However, Motion JPEG was never formally standardized.

In an alternative implementation the key frame encoder 3021 uses the JPEG2000 standard to encode the key frames 3011. In the JPEG2000 standard encoding an input image is optionally level shifted and transformed with a component transform. Thus, an input RGB colour space image, for example, may be transformed to an YCbCr colour space image. Each component of the (subsequent) image is transformed independently with a discrete wavelet transform. The wavelet transform coefficients are quantized to integer values and tiled into code-blocks. Each code-block is encoded in bit-planes, or fractions thereof, down to some minimum fractional bit-plane with an arithmetic coder. The encoded code-blocks are then grouped along with header information into a JPEG2000 code-stream. A JPEG2000 image is decoded by performing the inverse of each of these steps, as far as is possible.

While JPEG2000 is predominantly used to compress still images, Motion JPEG2000 encodes each frame of a video as a still image using JPEG2000. It provides a compressed video stream format for wrapping all the encoded frames of a video into a Motion JPEG2000 encoded stream.

In yet another alternative implementation the key frame encoder 3021 uses the H.264 standard to encode the key frames 3011. The H.264 standard is mainly used to compress videos. Intra H.264 is the mode where the H.264 standard is employed to encode key frames of video. Accordingly, the encoder 3021 employs intra H.264 to encode the key frames 3011. In the H.264 standard each frame is divided into one or multiple slices. Each slice consists of macro-blocks which are blocks of 16×16 luminance samples. On each slice a prediction processing step is carried out, which may either be a spatial or a temporal prediction.

The key frame encoder 3021 uses spatial prediction. In spatial prediction, macro-blocks may be subdivided into sub-macro-blocks, with each sub-macro-block having a size of 16×16, 8×8 or 4×4 samples. In spatial prediction all pixels of a block are predicted from block edge pixels.

In temporal prediction, motion estimation is carried out. To achieve more precise motion estimation the macro-blocks are also partitioned into sub-macro-blocks having a size of 16×16, 16×8, 8×16, 8×8, 8×4, 4×8 or 4×4 samples. The different sizes and shapes enhance the precision of the motion prediction.

After the prediction processing step a 2-D transformation is carried out on each block to spatially decorrelate the data. This 2-D transformation supports 8×8 and 4×4 blocks, and is based in integers which enable an exact inverse transformation without rounding errors. After each block has been 2-D transformed, the block samples are quantized. The quantization is controlled by a single quantization parameter which can be different for each single block. After quantization the 2-dimensional blocks are scanned in zigzag fashion such that the highest variance coefficients come first and the lowest variance coefficients come last. Finally, the sequences of coefficients are entropy encoded. In the H.264 standard there are two modes of entropy encoding: variable length coding and binary arithmetic coding. Both of those modes are context adaptive.

Figure 4A:
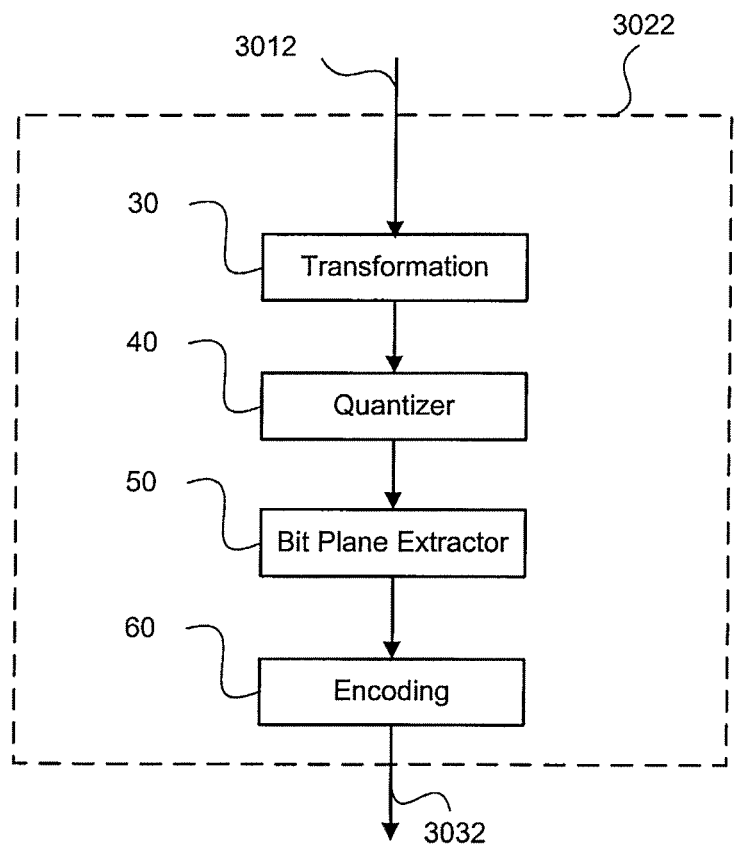
FIGS. 4A to 4D show schematic flow diagrams of processes within the systems of FIGS. 2 and 3 in more detail.

Having described the encoding of the key frames 3011, the encoding of non-key frames 3012 performed in the non-key frame encoder 3022 is described next with reference to FIG. 4A where a schematic flow diagram of the steps performed by the encoder 3022 is shown. Non-key frames 3012 are supplied as input for a transformation in step 30. In the preferred embodiment this transformation is a DCT. Within step 30 the input non-key frame 3012 is typically transformed as it is done in JPEG, namely the non-key frame 3012 is tiled in a plurality of blocks, each block comprising 8×8 pixels. Again, if necessary, extra columns of image pixel data are appended to the image by replicating a column of the image so that the image width is a multiple of eight. Similarly, a row of the image is replicated to extend the image, if necessary. Each 8×8 block of pixels is then discrete cosine transformed into an 8×8 block of DCT coefficients.

As an alternative embodiment, the transformation in step 30 may be wavelet transformation. In this alternative embodiment, the non-key frame 3012 does not have to be tiled into 8×8 blocks. The entire frame can be wavelet transformed and then tiled into 8×8 blocks. Again, if necessary, extra columns of image pixel coefficients can be appended to the transformed image so that the transformed image dimensions are multiples of eight.

Next, in step 40, each single 8×8 coefficient block is quantized. In the preferred embodiment quantization involves dividing each of the 8×8 DCT coefficients with a corresponding coefficient in an 8×8 quantization matrix, and rounding the result to the nearest integer. In the preferred embodiment, the value of a quantization step size parameter q is defined as:

$$q = 2 \times \log_2(1+\text{tol}), \quad (1)$$

where the constant tol is some tolerance, preferably 1% (0.01). Each 8×8 block of coefficients may have a different quantization step size parameter q. An advantage of using such a quantization step size parameter q is that the noise introduced by the quantization step 40 in some way matches the gain noise. The relative magnitude (gain noise/pixel magnitude) of gain noise is 1%. For quantization to match (in some way) the gain noise, it is desirable for a pixel x and its dequantized value x' to satisfy the constraint:

$$\frac{1}{1+g} \leq \frac{x'}{x} \leq 1+g \quad (2)$$

where g is the level of gain noise (e.g. g=0.01 for 1% gain noise). Now suppose the quantization is done uniformly in the log domain (y=log$_2$(x)) with a step size of q=2×log$_2$(1+tol), then the quantization error is bound as follows:

$$-\frac{q}{2} = -\log_2(1+tol) < y - y' \leq \frac{q}{2} = \log_2(1+tol) \quad (3)$$

since the quantization error is at most ½ the quantization step size. Transforming back to the original pixel (x) domain, the error bound is then:

$$2^{-\log_2(1+tol)} < 2^{y-y'} \leq 2^{\log_2(1+tol)} \Rightarrow \frac{1}{1+tol} < \frac{x}{x'} < 1+tol \quad (4)$$

Thus, the quantization noise matches, or satisfies the bound of, the gain noise. For example if the constant tol=1%, then the error introduced by the quantization is at a similar level to that of gain noise of 1%. By using such quantization, a high quality can be maintained while compressing. The quantization matches a gain noise of 1% (in a loose sense), while taking advantage of some basic frequency properties of the human visual system.

In other embodiments, other quantization step sizes can be used for quantizing the DCT coefficients in the luminance and chrominance channels. In particular the user may select a higher compression factor, trading off space for quality, which can be implemented by using larger quantization step sizes. Alternatively, the user may select a lower compression factor when quality is at a premium.

The quantization of step 40 is followed by bit plane extraction in step 50 where each block of coefficients is turned into a bit stream.

The bit stream from each coefficient block is sent to a turbo coder for encoding in step 60 to form an encoded bit stream of each block.

The turbo coder used in step 60 is now described in greater detail with reference to FIG. 4B where a schematic block diagram of the turbo coder 60 is shown.

The turbo coder 60 receives as input the bit stream 2000 from the bit plane extractor 50 and which consists of the bits from the coefficient block. An interleaver 2020 interleaves the bit stream 2000 (the information bit stream, also called the systematic bits). In the preferred embodiment this interleaver 2020 is an algebraic interleaver. However, in alternative embodiments any other interleaver known in the art, for example a block interleaver, a random or pseudo-random interleaver, or a circular-shift interleaver, may be used.

The output from the interleaver 2020 is an interleaved bit stream, which is passed on to a recursive systematic coder 2030 which produces parity bits. One parity bit per input bit is produced. In the preferred embodiment the recursive systematic coder 2030 is generated using the octal generator polynomials 23 and 35.

A second recursive systematic coder 2060 operates directly on the bit stream 2000 from the bit plane extractor 50. In the preferred embodiment the recursive systematic coders 2030 and 2060 are identical. Both recursive systematic coders 2030 and 2060 output a parity bit stream to a puncturer 2040. Each parity bit stream is equal in length to the input bit stream 2000.

The puncturer 2040 deterministically deletes parity bits to reduce the parity bit overhead previously generated by the recursive systematic coders 2030 and 2060. Typically, so called half-rate codes are employed which means that half the parity bits from each recursive systematic encoder 2030 and 2060 are punctured.

The turbo coder 60 produces as output the punctured parity bit streams, which comprises parity bits produced by recursive systematic coders 2060 and 2030.

Having described the encoding of both the key frames 3011 and the non-key frames 3012 fully, the updating of the key frame data by the key frame updater 3400 and the joint decoding performed in the joint decoder 3100 are now described.

In a first embodiment a first set of key-frames 3310 is retrieved by the key frame updater 3400 from the storage device 1030. A second set of encoded key-frames 3031 is retrieved by the key frame updater 3400 from the key frame encoder 3021 over the storage or transmission medium 3003. The second set of encoded key-frames 3031 is decoded using conventional JPEG (intra) decoding 1140, which results in a second set of decoded key frames.

The two sets of key-frames are combined by the key frame updater 3400 by compositing operations, such as weighted linear combination of pixel values, or alternatively interpolations or extrapolations. In the preferred embodiment this is achieved by averaging corresponding pixel values. In an other embodiment the generation of the updated key frame 3033 is solely based on the first set of key frames 3310 which is retrieved by the key frame updater 3400 from the storage device 1030, if the second set of encoded key frames which is retrieved from the storage or transmission medium 3003 is too corrupted to be used. A test of the retrieved second set of key frames against a predetermined limit may be used to assess a level of corruption.

Figure 3:
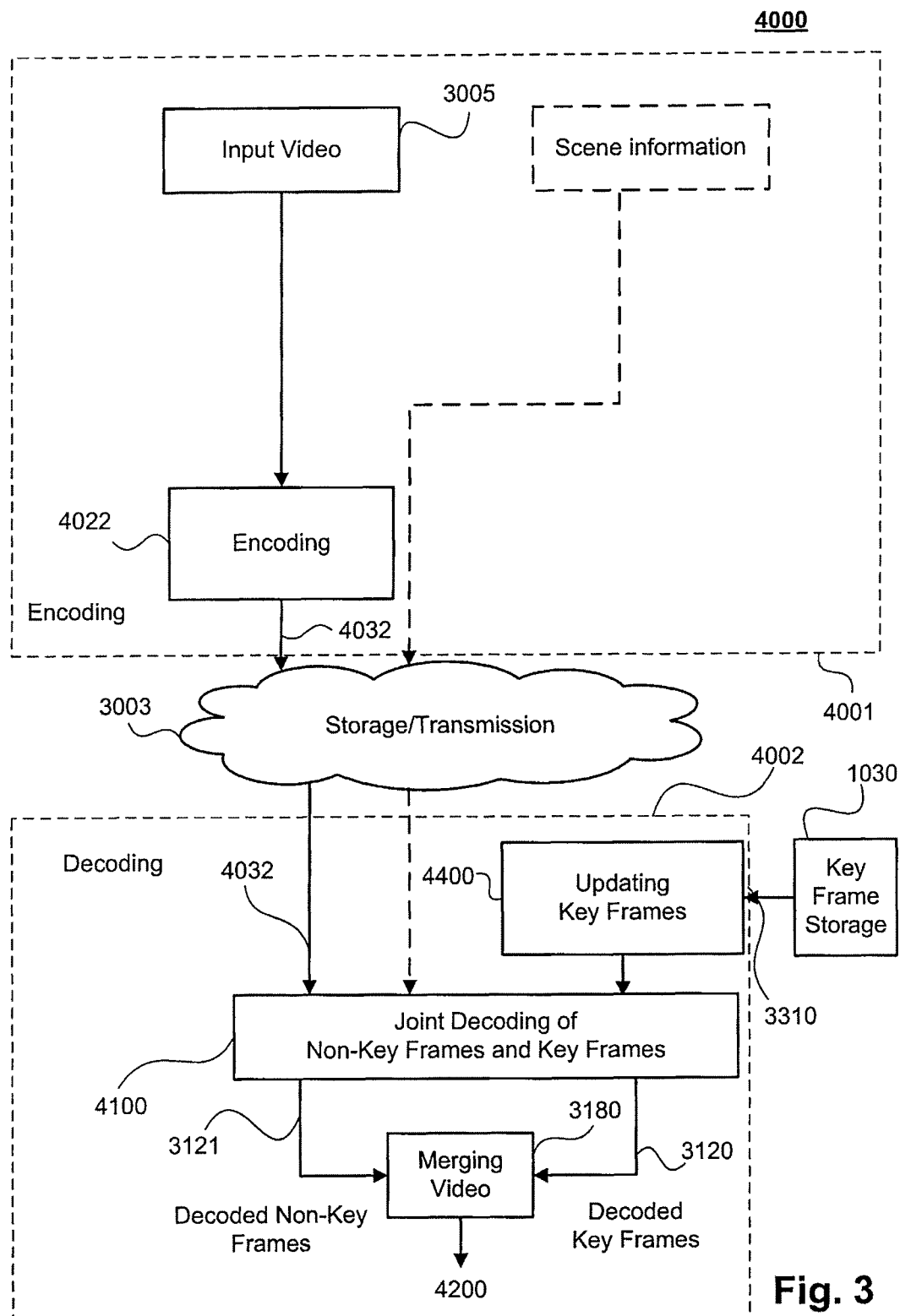

In a further embodiment 4000 illustrated in FIG. 3, a first set of key-frames 3310 is retrieved from the key frame storage 1030. From the storage or transmission medium 3003 scene related information, such as the brightness of the scene captured in the input video 3005, is received. This information may be produced by the input video 3005 and may be a subset of the input video. Alternatively the information may be collected by an additional sensor. Hence, in this further embodiment key frames 3011 are not encoded and passed to the decoder 3002, as is the case in the first embodiment. The first set of key-frames 3310 is modified in a key frame updater 4400 of a decoder 4002 according to the scene related information. For example, in the case where the scene related information includes the brightness of the scene, the brightness of the key frames 3310 from the key frame storage 1030 are corrected in favour of the current brightness conditions.

In the encoder 4001, the input video 3005 is encoded in encoder 4022 to form encoded video 4032. In the present embodiment the encoded video 4032 includes both parity data and non parity bit data. Accordingly, the joint decoder 4100 decodes the encoded video data 4032, while utilizing the updated key frame data to select the appropriate key frames from the key frame storage 1030. Once suitable key frame information is selected, based on the non parity data, the parity information can be applied to produce the decoded video frame.

In the case where the scene related information includes the time of day, whether the scene is illuminated with natural light, or the setting of light switches if there is only artificial light in the scene, the scene related information is used by the key frame updater 3400 to modify the first set of key-frames 3310.

In a further embodiment the scene related information includes camera parameters, such as tilt and zoom, and the key frame updater 3400 searches for corresponding pixel information on the key frame storage device 1030 based on the camera tilt and the zoom settings.

In a yet further embodiment a combination of the embodiments described above is used to improve the quality of the first set of key-frames 3310.

In the preferred embodiment the scene related information retrieved from the key frame storage 3300 preferably comprises a background model of the scene being captured, with the background model having been generated by modelling each pixel as a mixture of Gaussian distributions as it is known in prior art. In an alternative embodiment the background model is generated by pixels which are static over some time interval.

In the following the decoding of the encoded non-key frames 3032 performed in the joint decoder 3100 is described in detail with reference to FIG. 4C where a schematic block diagram of the joint decoder 3100 is shown.

The updated key-frames 3033 are received and provided as decoded key frames 3120.

The decoded key frames 3120 are also supplied to an estimator 1150 where the preceding five (decoded key or non-key) frames are used to obtain an estimate for the next frame to decode. Techniques to obtain this estimate may be any low complexity motion estimation, any full motion estimation, any multi-frame motion estimation, and sub-motion estimation as they are described in the literature in the art. Alternative methods can be from the vast field of interpolations and from the vast field of extrapolations or any combination of motion estimation, interpolation and extrapolation.

The estimated frame from the estimator 1150 is supplied to a discrete cosine transformer 1160 where a transformation of the estimated frame is produced. This results in a frame of predicted DCT coefficients in the preferred embodiment.

The encoded bit stream 3032 from a non-key frame is decoded by the decoder 1080. This is the inverse operation of the encoding performed by encoder 60 (FIG. 4B). It is noted that the output of the decoder 1080 is coefficients in the transformation domain. After all blocks of the non-key frame are decoded, the complete non-key frame is available in the transform domain.

Furthermore, the decoder 1080 also obtains input 1085 from the discrete cosine transformer 1160, with that additional information being used to improve the decoding quality. The decoder 1080 is described in more detail below.

Figure 4B:
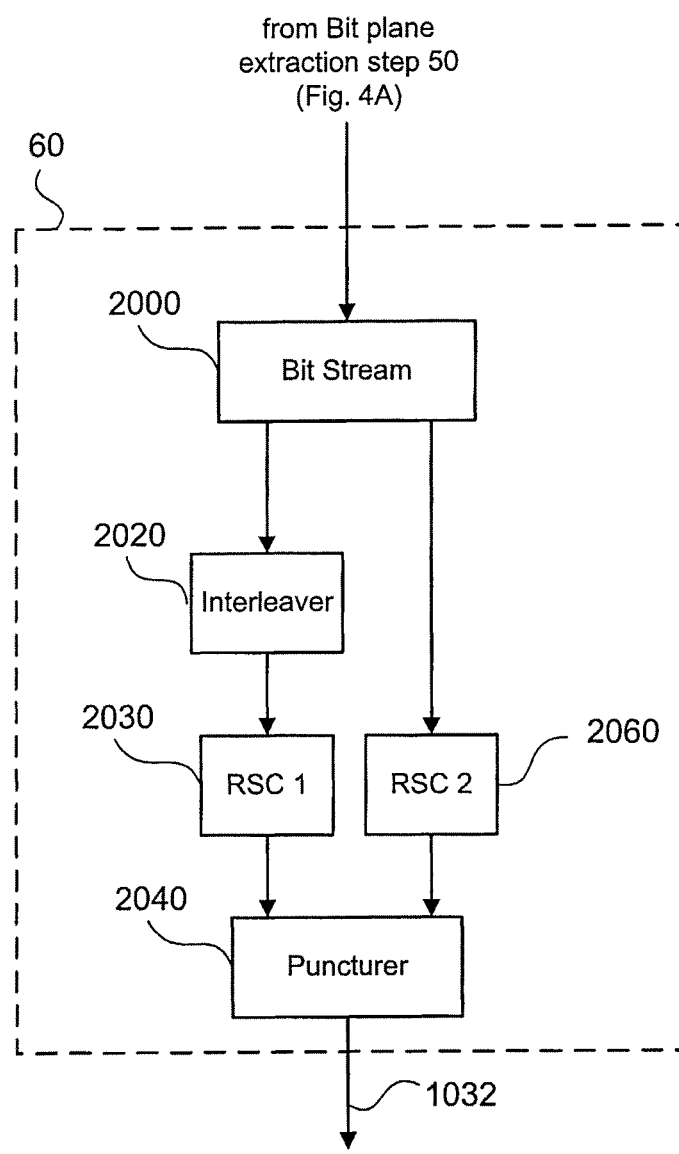
Figure 4C:
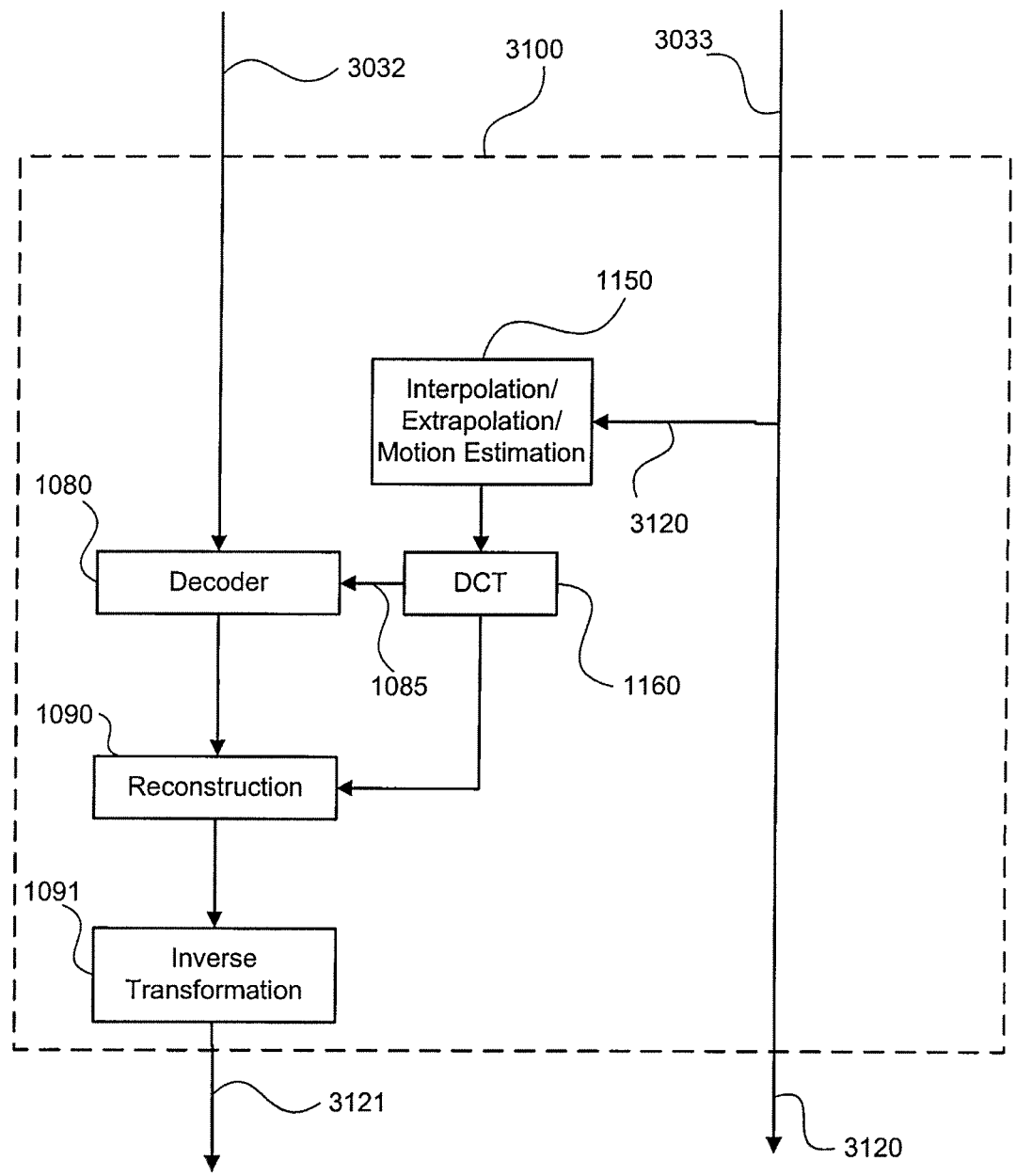

A reconstructor 1090 of FIG. 4C receives two inputs. The first input is the decoded bit stream from the decoder 1080 representing DCT coefficients. This is a first set of DCT coefficients representing the current video frame. The second input to the reconstructor 1090 is the side information DCT coefficients produced by the discrete cosine transformer 1160, which is a second set of DCT coefficients representing the current video frame for a second time. In the reconstructor 1090 these two sets of DCT coefficients are compared. In the preferred embodiment, a DCT coefficient from the first set of DCT coefficients is compared to the DCT coefficient from the same pixel location of the second set of DCT coefficients. If this difference is sufficiently small, then the resulting DCT coefficient for this pixel location is set to be equal to the DCT coefficient from the second set of DCT coefficients in the preferred embodiment. If this difference is not sufficiently small, then the resulting DCT coefficient equals the DCT coefficient from the first set of DCT coefficients.

In an alternative embodiment, the DCT coefficients from the first and second sets are combined by a convex combination as follows:

$$\text{coeff}_{res} = \alpha \cdot \text{coeff}_{set1} \cdot (1-\alpha) \cdot \text{coeff}_{set2}, \quad (5)$$

where $\text{coeff}_{res}$ denotes the resulting DCT coefficient, and $\text{coeff}_{set1}$ and $\text{coeff}_{set2}$ denote the DCT coefficients from the first and second sets of DCT coefficients. Parameter $\alpha$ depends on the difference between the DCT coefficients $\text{coeff}_{set1}$ and $\text{coeff}_{set2}$.

The resulting DCT coefficients $\text{coeff}_{res}$ from the reconstructor 1090 are supplied to an inverse transformer 1091 where inverse transformation is carried out. This is the inverse of the transformation performed in transformer 30 (FIG. 4A). The output of the inverse transformer 1091 is completely decoded non-key frames 3121.

The decoded non-key frames 3121 and the decoded key frames 3120 are supplied to merger 3180 (FIG. 2) where the frames 3120 and 3121 are merged to form complete decompressed video output 3200.

Having described the joint decoder 3100, the decoder 1080 within the joint decoder 3100 is now described in further detail with reference to FIG. 4D where a schematic block diagram of the decoder 1080 is shown. The decoder 1080 receives the encoded bit stream 3032 as parity bits 6000, and an output 1085 of the DCT transformer 1160 as systematic bits 6010.

The parity bits 6000 are split into two sets 6020 and 6040 of parity bits: one set 6020 for the parity bits originating from the recursive systematic coder 2030 (FIG. 4B) and one set 6040 of parity bits originating from the recursive systematic coder 2060 (FIG. 4B). The steamed content of the parity bits 6020 and 6040 are outputs of RSC1 2030 and RSC2 2060 after puncturing by the puncturer 2040. The information in the streams will depend on the operation of the puncturer 2040 and will normally contain different information from each other.

As seen in FIG. 4B, the Parity Bits 6020 are input to a Component Decoder 6060, which preferably employs the Max-Log Maximum Aposteriori Probability (MAP) algorithm known in the art. In alternative embodiments the MAP, the Soft Output Viterbi Decoder (SOVA) or variations thereof are used instead of the Max-Log MAP algorithm.

The systematic bits 6010 are passed as input to an interleaver 6050. This interleaver 6050 is also linked to the component decoder 6060.

In a similar manner, the Parity Bits 6040 are input to a Component Decoder 6070, together with the systematic bits 6010.

Figure 4D:
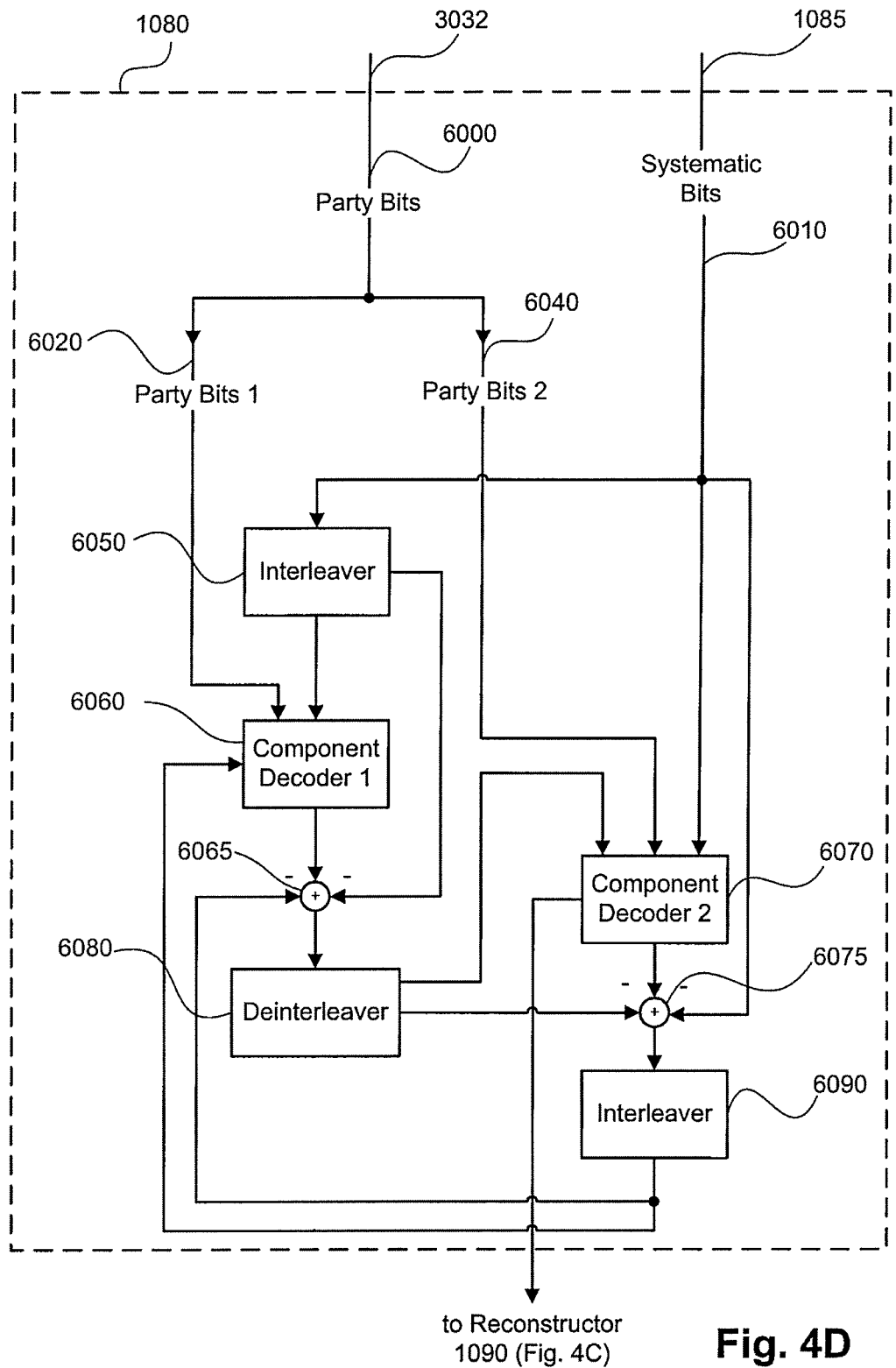

As can be seen in FIG. 4D, the decoder 1080 works iteratively. A loop is formed starting from the component decoder 6060, to a first adder 6065, to a deinterleaver 6080, to a (second) component decoder 6070, to second adder 6075, to a second interleaver 6090 and back to the first component decoder 6060.

The processing performed in this loop is now described in more detail. The component decoder 6060 takes three inputs—the parity bits 6020, the interleaved systematic bits from the interleaver 6050 and some output from the second component decoder 6070, which was modified in the adder 6075 and interleaved in the interleaver 6090. The input from the one component decoder to the other component decoder provides information about the likely values of the bits to be decoded. This information is typically provided in terms of the Log Likelihood Ratios $$L(u_k) = \ln\left(\frac{P(u_k = +1)}{P(u_k = -1)}\right),$$

where $P(u_k=+1)$ denotes the probability that the bit $u_k$ equals +1 and where $P(u_k=-1)$ denotes the probability that the bit $u_k$ equals −1.

In the first iteration the feedback input from the second component decoder 6070 does not exist, whereas in the first iteration this input is set to zero.

The (decoded) bit sequence produced by component decoder 6060 is passed on to adder 6065 where the so-called a priori information related to the bit stream is produced: the received systematic bits 6050 are extracted in adder 6065 and the information produced by the second component decoder 6070 (which are processed analogously in adder 6075 and interleaved in interleaver 6090) are extracted as well. Left over is the a priori information which gives the likely value of a bit. This information is valuable for the next decoder.

After adder 6065 the resulting bit stream is de-interleaved in deinterleaver 6080, which performs the inverse action of interleaver 6050. The de-interleaved bit stream from deinterleaver 6080 is provided as input to the component decoder 6070. In the preferred embodiment the component decoder 6070 as well as adder 6075 works analogously to the component decoder 6060 and the adder 6065 already described. The resulting bit stream from the adder 6075 is again interleaved in interleaver 6090 and used as input for the second iteration to the first component decoder 6060.

In the preferred embodiment eight iterations between the first component decoder 6060 and the second component decoder 6070 are carried out. After completion of eight iterations the resulting bit stream produced from component decoder 6070 is output from the decoder 1080 to the reconstructor 1090 (FIG. 4C). This completes the description of the joint decoding of both key and non-key frames.

The foregoing describes decoding of video data. By storing key frame data in the key frame storage 1030, an initial estimate of video data from a first source is stored. Later, parity bit data for correcting estimates derived from video data from the first sources is received from a second source. The data from the first and second sources independently encoded. The stored initial estimate is then retrieved and used together with the parity bit data from the second source to decode the video data.

The foregoing describes only some embodiments of the present invention, and modifications and/or changes can be made thereto without departing from the scope and spirit of the invention, the embodiments being illustrative and not restrictive.

I claim:

1. A method of decoding media data of a scene using joint decoding of independently encoded sources, said method comprising the steps of:
    decoding each key frame of a plurality of key frames of first media data of the scene received from a first source of said independently encoded sources;
    storing the plurality of decoded key frames at a storage location separate from the independently encoded sources;
    receiving second media data of the scene from a second source of said independently encoded sources, said second media data comprising parity bit data;
    retrieving a set of key frames from the plurality of decoded key frames stored at the storage location;
    modifying the set of key frames retrieved from the storage location in favor of a current brightness condition of the scene; and
    utilizing the set of modified key frames to decode the second media data of the scene.

2. A method according to claim 1 wherein said media data of the scene comprises video frame data.

3. A method according to claim 1 wherein the second media data further comprises non parity bit data.

4. A method according to claim 1 wherein said first media data is key frame data and said second media data is non-key frame data.

5. A method according to claim 1, further comprising receiving third media data from the second source, testing the third media data to assess a level of corruption, and where the corruption exceeds a predetermined limit, utilizing the set of modified key frames and the received second media data to decode the media data of the scene.

6. A method according to claim 1, wherein the decoded key frames are formed by applying compositing operations to at least a portion of the first media data.

7. A method according to claim 1, wherein the set of modified key frames are combined with a key frame from the first source of said independently encoded sources to update the set of modified key frames.

8. A method according to claim 7, wherein the current brightness condition of the scene is determined based on properties of the key frame from the first source of said independently encoded sources.

9. A method according to claim 1, wherein the current brightness condition of the scene is determined based on camera parameters.

10. A decoder for decoding media data of a scene using joint decoding of independently encoded sources, said decoder comprising:
    means for decoding each key frame of a plurality of key frames using first media data of the scene received from a first source of said independently encoded sources;
    a storage device for storing said plurality of decoded key frames at a storage location separate from the independently encoded sources;
    means for receiving second media data of the scene from a second source of said independently encoded sources, said second media data comprising parity bit data;
    means for retrieving a set of key frames from the plurality of decoded key frames stored at the storage device;
    means for modifying each key frame of the set of key frames retrieved from the storage device in favor of a current brightness condition of the scene; and
    a joint decoder for utilizing the modified key frames to decode the second media data of the scene.

11. A decoder according to claim 10, wherein the means for decoding the plurality of key frames operates to apply compositing operations to at least a portion of the first media data.

12. A non-transitory computer readable storage medium having recorded thereon a computer program for implementing a method of decoding media data of a scene using joint decoding of independently encoded sources, said computer program comprising:
    code for decoding each key frame of a plurality of key frames of first media data of the scene received from a first source of said independently encoded sources;
    code for storing the plurality of decoded key frames at a storage location separate from the independently encoded sources;
    code for receiving second media data of the scene from a second source of said independently encoded sources, said second media data comprising parity bit data;
    code for retrieving a set of key frames from the plurality of decoded key frames stored at the storage location;
    code for modifying the set of key frames retrieved from the storage location in favor of a current brightness condition of the scene; and
    code for utilizing the set of modified key frames to decode the second media data.

13. A method of decoding video data of a scene using joint decoding of independently encoded video sources, said method comprising the steps of:
    decoding each key frame of a plurality of key frames from first video data of the scene received from a first source of said independently encoded video sources;
    storing the plurality of decoded key frames at a storage location separate from the independently encoded video sources;
    receiving second video data of the scene from a second source of said independently encoded video sources, said second video data comprising parity bit data;
    retrieving a set of key frames from the plurality of decoded key frames at the storage location;
    modifying the set of key frames retrieved from the storage location in favor of a current brightness condition of the scene; and
    utilizing the set of modified key frames to decode the received second video data of the scene.

14. A method according to claim 13 wherein the independently encoded video sources are each derived from an encoding of video derived from a single source.

\* \* \* \* \*